United States Patent [11] 3,629,492

[72] Inventor David S. McVoy
Gainesville, Fla.
[21] Appl. No. 859,081
[22] Filed Sept. 18, 1969
[45] Patented Dec. 21, 1971
[73] Assignee Coaxial Scientific Corporation

[54] COLOR TELEVISION CAMERA AND METHOD
7 Claims, 3 Drawing Figs.

[52] U.S. Cl. .................. 178/5.4 R, 178/5.4 ST, 178/5.4 CF
[51] Int. Cl. .................. H04n 9/06
[50] Field of Search .................. 178/5.2, 5.4, 5.4 CF, 5.4 ST

[56] References Cited
UNITED STATES PATENTS

| | | | |
|---|---|---|---|
| 2,703,340 | 3/1955 | Hoyt | 178/5.4 CF |
| 2,739,181 | 3/1956 | Sleeper, Jr. et al. | 178/5.2 |

*Primary Examiner*—Richard Murray
*Attorney*—Spector & Alster

ABSTRACT: A color television camera and method utilizes a standard black and white television camera with a vidicon tube. Light from the object having being viewed passes through a lens system which causes the light to pass through color filters located at the periphery of a rotating filter wheel, after which the image is focused onto the light-sensitive surface of the vidicon tube. The filter wheel contains red, green and blue filters and is rotated by a motor, the speed of which is synchronized with the horizontal scanning rate of the tube such that successively scanned lines will contain successively different color information. The number and disposition of the filters are such that the phase of the color output is changed for every revolution of the wheel so that for every third frame substantially every scanned line will have been illuminated by each color. The color outputs are then separated for feeding to standard coding equipment or to a conventional color receiver.

INVENTOR
DAVID S. McVOY by: Spector + Alster
ATTYS.

COLOR TELEVISION CAMERA AND METHOD

This invention relates to a color television camera and method associated with the same.

One type of color television system which is known in the art is the so called field sequential system. In this system an ordinary black and white camera is fitted with a rotating filter wheel containing primary color filters that pass in front of the lens sequentially. A like filter wheel is placed in front of the receiver screen, and the two wheels are synchronized as to phase and are rotated at the frame scanning rate. If the frame scanning rate is 1/30th second (the present broadcast standard), the color wheel is synchronized in such a way that one particular primary color filter will be in front of the camera lens and the receiver screen for 1/30th second. Thus the color information is transmitted sequentially, and the entire color picture is transmitted every 1/10th second.

Aside from the fact that the foregoing system is incompatible with present color television receivers, the human eye is capable of detecting the flicker inherent in this system. Changing the scanning rate is not possible because of present broadcast standards and in accordance with which existing television receivers are designed.

The present broadcast method of colorcasting utilizes, in effect, three cameras simultaneously, one for each of the primary colors. An encoding device multiplexes all three camera outputs on one television channel and a three gun color picture tube is utilized in the conventional receiver. By this arrangement all three primary colors are transmitted simultaneously. One principal disadvantage in this system is the high cost of the camera unit.

An object of this invention is to provide color television camera and color video signal generation method which takes advantage of the sequential system's simplicity and low cost and yet eliminates the problem of flicker.

A further object of this invention is to provide a camera and method which can be used with conventional color encoding and broadcasting equipment and thus is compatible with present color television receivers and transmitters.

In accordance with the foregoing objects, the invention comprises scanning the light-sensitive surface of a conventional vidicon camera tube while presenting only monochromatic light of primary colors to said surface as each line is scanned by the electron beam of the tube, the color of the monochromatic light changing for each line in a sequence such that, for example, a line is scanned with red presented to the surface, the next line with green, the next line with blue, and then repeating in that order for succeeding lines until the frame has been scanned. At the end of the frame, the phase of the color presentation is shifted 120° for scanning the next frame, and is again shifted 120° for the third frame. At the end of the third frame the lines will have been scanned with color information for each primary color. The scanning rate is 1/60th second per frame. Since the video information is sent from the camera line by line, there will be a sequence of video signals representing the color information. These signals are separated as to color so that they may be sent to a conventional color receiver or to an encoder for broadcast transmission in the usual way.

In a preferred form of the invention the monochromatic colors are presented to the vidicon tube by filters that are mounted on the periphery of a wheel that is driven by a synchronous motor. The speed of the motor and the number of filters are such that a filter of any one color is in the path of light from the object to the image-receiving surface of the vidicon for that brief period when one line is being scanned. When the next line is being scanned the next filter of the wheel will be in the aforesaid path of light.

The attainment of the above and further objects of this invention will be apparent from the following description taken in conjunction with the accompanying drawing forming a part thereof.

Figures 1, 2, 3:
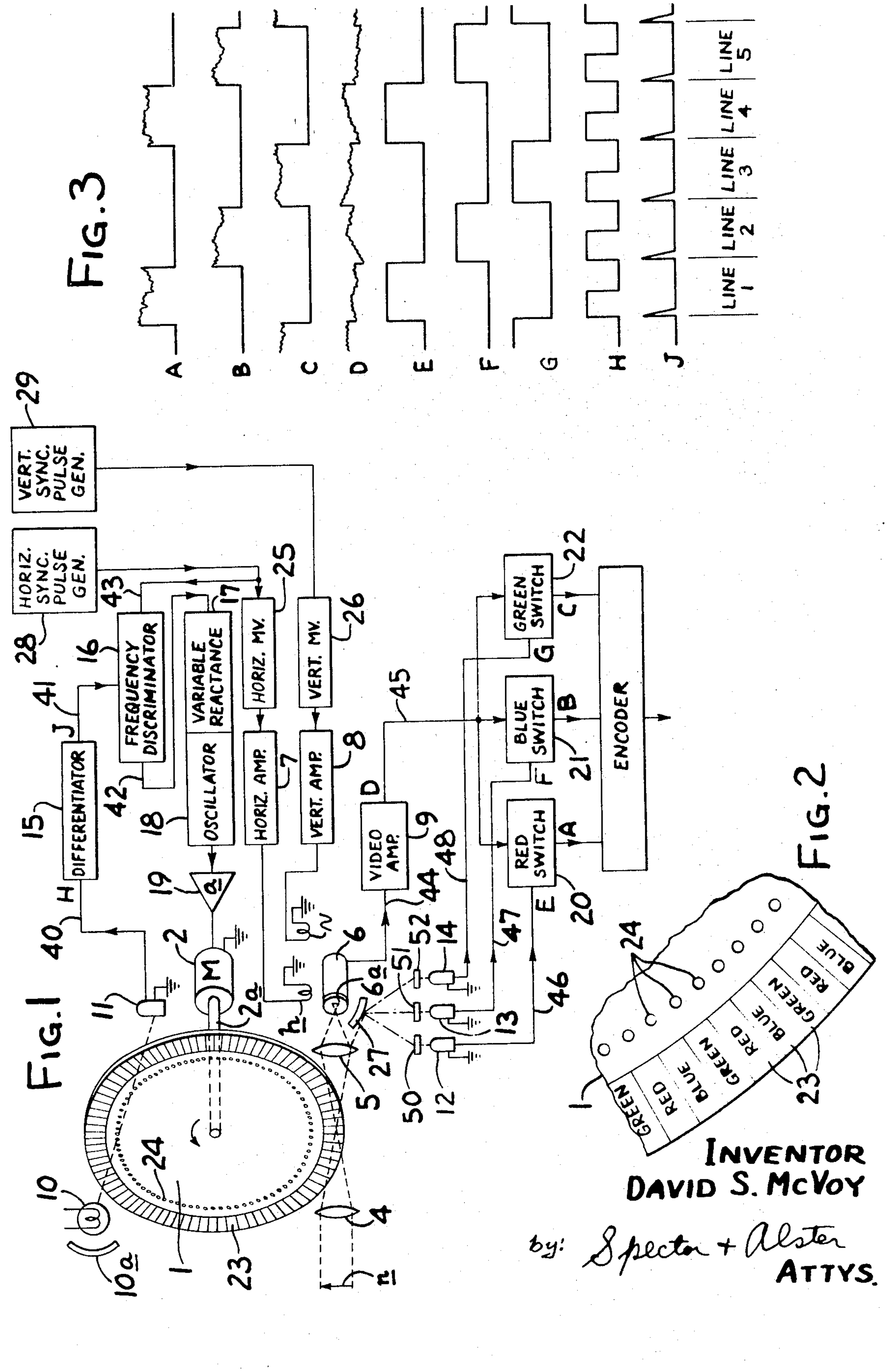
FIG. 1 is a schematic of a camera and system in accordance with the invention.
FIG. 2 is an enlarged fragmentary portion of the periphery of the filter wheel.
FIG. 3 shows the wave forms at certain points of the circuits that form part of the camera system.

Referring in more detail to the drawing the camera comprises a standard black and white television camera containing a conventional vidicon camera tube 6 having a light-sensitive surface 6$a$ upon which the image $n$ to be televised is displayed. The camera also includes the usual horizontal and vertical deflection coils $h$, $v$ and their associated deflection circuits 7, 8, and vertical and horizontal deflection multivibrators 25, 26. The multivibrators are driven by conventional horizontal and vertical synchronizing pulse generators 28, 29.

The camera also includes a flat wheel 1 having a series of peripherally disposed filters 23 and the wheel also has holes 24 radially inwardly of and adjacent to the respective filters 23. As shown in FIG. 2, the filters 23 are successively red, blue, green, repeating in that pattern over the wheel. The filters filter out all colors except the color designated. Preferably, the wheel 23 has 262 filter discs 23 and so the red-blue-green pattern repeats 87 times leaving one extra filter which may be of any one of those three primary colors. The wheel is mounted centrally on the shaft 2$a$ of a synchronous motor 2.

The periphery or filter disc-containing portions of the wheel 1 passes between lenses 4, 5 which receive light from the object $n$, pass the light through one of the filters 23 and then focus the image onto the surface 6$a$ of the vidicon tube 6. The lens 4 produces a small image that is smaller in area than that of a filter disc 23, and this image may be just behind the general plane of the filters. The lens 5 may focus on that small image (which, optically, is an "object" viewed by the lens 5) to position the image onto the surface 6$a$. As a result, the light that strikes the surface 6$a$ will be monochromatic and of a color dependent upon the color of the filter 23 through which the light passed.

The standard broadcast horizontal synchronizing frequency is 15,750 cycles per second and there are 525 lines per frame of the picture being transmitted. The line-by-line scanning of the electron beam from the vidicon tube 6 will be determined by the outputs of the synchronizing pulse generators 28, 29. Such scanning may be of the two-to-one interlace type, that is scanning alternate lines in 1/60th of a second and then scanning the remaining alternate lines in the remaining 1/60th of a second, or the scanning may be of a predetermined but random interlace type. With 262 filters 23 in the wheel 1 the motor 2 should rotate at a speed which is the quotient of the synchronizing frequency and the number of filters 23 in the wheel. In the present case, the motor speed should be 3606.6 r.p.m. At this speed, there can be a different filter 23 in the light path from the object $n$ to the surface 6$a$ for each line being scanned.

The motor 2 is driven by an amplifier 19, which is in turn driven by a conventional variable reactance controlled oscillator 18 so that the speed of the motor 2 is controlled by the frequency of the oscillator 18. The oscillator has a nominal frequency of 60 c.p.s. A light source 10 with reflecting mirror 10$a$ is located adjacent to the wheel 1 for illuminating a photocell 11 on the opposite side of the wheel 1 through the holes 24 that successively pass in front of the photocell 11. The electrical output of the photocell 11 on conductor 40 produces a waveform at H, which is shown in FIG. 3. This signal is passed through a conventional differentiator circuit 15 to produce the waveform J (FIG. 3) on conductor 41. The signal on conductor 41 is fed into a conventional frequency discriminator 16, such as a ratio detector, and the output of the frequency discriminator is fed over conductor 42 to the variable reactance 17 of the oscillator unit. Into the other side of the frequency discriminator 16 and over conductor 43 the reference pulses from the broadcasts station's horizontal synchronizing pulse generator 28 are fed. The output from the differentiator 15 and the reference pulses are compared and if a sum or difference signal is produced, this will be fed over conductor 42 to the variable reactance 17 to vary the frequency of the oscillator 18 and thereby correct the speed of the motor 2.

The position of the photocell 11 and the locations of the holes 24 may be such that the pulse J on conductor 41 can be made to occur at the leading edge of the filter disc 23 as it traverses the light path from the object *n* to the surface *6a*. This timing of the pulse J will correspond to with the horizontal retrace of the electron beam of the vidicon tube 6 but will still allow the filter 23 to be in proper position during the following trace or scan. Since the electron beam scans the image on the surface *6a* once every 15,750th of a second there will be a pulse J once per horizontal line. Moreover, since a new filter will be present in the light path from the object *n* to the surface *6a* at the beginning of each horizontal scanning line, successively scanned lines will successively contain red, blue and green color information. This video information is represented by the signal output from the vidicon tube 6 over conductor 44, which signal passes through a wide band video amplifier 9. The output D on conductor 45 from the video amplifier 9 is thus a signal of successive red, blue and green color information. Such signal at D is shown in FIG. 3.

A mirror 27 is inserted in the lower edge of the monochromatic light beam that has passed through a filter 23 and is proceeding toward the vidicon tube 6. This mirror 27 reflects the monochromatic light to red, blue and green filters 50, 51, 52 respectively, that are disposed across respective photocells 12, 13, 14. Thus for each line being scanned only one of the photocells 12, 13, 14 will be activated, namely the one corresponding to the color of the light reflected by the mirror 27 which is the same as the color sent to the vidicon tube for that particular line being scanned.

From conductor 45 the color signals are sent to conventional electronic switches or gates 20, 21, 22 representing the respective colors. The red filtered photocell 12 provides a control signal over conductor 46 to the switch 20, the blue filtered photocell 13 provides a control signal over conductor 47 to switch 21 and the green filtered photocell 14 provides a control signal over conductor 48 to switch 22. The signals at E, F and G and their phase relationships are shown in FIG. 2 with respect to those successive lines that are scanned. The outputs from the three switches 20, 21, 22 are the result of separating the color information according to color and the waveforms A, B, C, shown in FIG. 2, may be sent to a conventional encoder for broadcasting, or directly to a three color receiver.

Since the wheel 1 contains 262 filters, the presence of the odd filter results in the phase of the color output being shifted 120° for each revolution of the wheel 1. Thus if a particular line scanned contains the red information on the first scan, this line would contain blue information on the second scan and green information on the third scan. Therefore, for every third frame substantially all lines will have been illuminated with each of the red, green and blue information. In practice interlaced field sequential scanning may be used in which 262½ alternate line are scanned each 1/60th second and with the entire frame of 525 lines being scanned in 1/30th second. The operation of the filter wheel 1, as described, is compatible with this type of scanning. In any event, even though the entire color picture is transmitted only every three frames or 1/10th of a second, the rapid rate in which the color information is presented will preclude detection by the eye of flicker in the picture.

Because an odd filter is used to provide for the phase shift of the color presentation while keeping the speed of the motor 2 constant, there will be four lines in a three frame transmission that will not contain all of the color information. However, on the next scannings or frames those lines will pick up the missing color information. Such condition is not considered to be objectionable since the other lines and thus substantially all lines do contain all of the color information in three frames, and the rate of color presentation is exceedingly fast in any event.

For closed circuit television systems where random self-contained synchronization is used, the motor 2 may be directly connected to a 60 cycle source and be driven at a speed of exactly 3,600 r.p.m. The output of the differentiator 15 on conductor 41 can be connected directly to the horizontal multivibrator 25. The vertical multivibrator 26 may be of a type that is free running. The two external synchronizing pulse generators 28, 29 as well as the frequency discriminator 16, variable reactance controlled oscillator 17, 18, and amplifier 19 can be eliminated.

The invention is not limited to the precise form herein shown and described, it being understood that various modifications may be made without departing from the scope of the invention.

I claim:

1. A video camera comprising means for displaying an image corresponding to an object being viewed by the camera, means for repeatedly scanning the image line by line to produce output video signals representing the image, means synchronized with the operation of said scanning means for passing onto said image-displaying means from said object only monochromatic light during the scanning of each line to produce as the output video signals those signals corresponding to the monochromatic light scanned for each line, the monochromatic light being passed by said synchronized means during the scanning of three successive lines being of three successive colors and repeating in a predetermined pattern in which the monochromatic light for each of said three lines is a different one of said three colors for each successive scanning of each line.

2. A video camera according to claim 1 including means for detecting in said video output the signals representing the respective colors, and means responsive to said detecting means for separating the signals of the respective colors.

3. A video camera according to claim 1 in which said synchronized means comprises filters which pass to said image-displaying means said colors in a sequence of successive different colors in one order, said order being repeated for a predetermined number of times, and then the order being changed for at least one sequence to shift the phase relationship of the presentation of the filters relative to the scanning.

4. A method of producing video color information which comprises scanning a light-sensitive surface line by line with an electron beam, presenting only monochromatic light to said surface during the scanning of each line, transmitting over a circuit the video-representing electrical output of each scanned line, changing the color of the monochromatic light in a predetermined repeating sequence for the successive lines being scanned throughout a predetermined number of line scannings so that the transmitted video-representing output on said circuit is a succession of signals representing color information for successive lines scanned, and after completion of the scanning of said predetermined number of lines changing the phase of the presented sequence of colors so that upon a second scanning of said predetermined number lines, each line will be scanned bearing a color that is different from the color that was scanned for that line on the first scanning thereof.

5. A method according to claim 4 further comprising detecting the color representing signals over said circuit, and separating the signals of the respective colors.

6. In a color television transmission apparatus, a video camera having an image-transmitting tube with a light-sensitive area that displays a black and white image corresponding to an object being viewed by the camera, means for repeatedly scanning the image line by line to produce a succession of video output signals constituting a frame of video information, means synchronized with the operation of said scanning means for passing onto said light-sensitive area from substantially the entire object only monochromatic light during the scanning of each line to produce as the output video signals those signals respectively corresponding to the monochromatic light scanned for each line, said synchronized means being so constructed and arranged that the monochromatic light being passed during the scanning of the lines of the frame will be of successive colors repeating in a predetermined pattern, the pattern being such that the monochromatic light for a line during one scanning thereof will be different from the monochromatic light for that same line during the following scanning thereof, and means for detecting in said video output signals the signals representing the respective colors.

7. In a color television transmission apparatus according to claim 6, means responsive to said detecting means for separating the signals of the respective colors.

* * * * *